US008971839B2

(12) United States Patent
Hong

(10) Patent No.: US 8,971,839 B2
(45) Date of Patent: *Mar. 3, 2015

(54) IN-VEHICLE SYSTEM (IVS) CONTROL OF EMERGENCY DATA COMMUNICATIONS

(71) Applicant: Airbiquity Inc., Seattle, WA (US)

(72) Inventor: Leon Hong, Seattle, WA (US)

(73) Assignee: Airbiquity Inc., Seattle, WA (US)

(*) Notice: Subject to any disclaimer, the term of this patent is extended or adjusted under 35 U.S.C. 154(b) by 109 days.

This patent is subject to a terminal disclaimer.

(21) Appl. No.: 13/786,733

(22) Filed: Mar. 6, 2013

(65) Prior Publication Data

US 2013/0183925 A1    Jul. 18, 2013

Related U.S. Application Data

(63) Continuation of application No. 12/716,103, filed on Mar. 2, 2010, now Pat. No. 8,417,211.

(60) Provisional application No. 61/156,968, filed on Mar. 3, 2009.

(51) Int. Cl.
*H04M 11/04* (2006.01)
*H04W 4/04* (2009.01)
(Continued)

(52) U.S. Cl.
CPC ............ *H04W 4/046* (2013.01); *H04M 11/04* (2013.01); *H04M 11/066* (2013.01); *H04M 2242/04* (2013.01); *H04W 4/22* (2013.01); *H04W 76/007* (2013.01); *H04W 76/02* (2013.01)
USPC ........... 455/404.1; 455/450; 455/451; 379/45

(58) Field of Classification Search
CPC ... H04W 4/046; H04W 76/007; H04W 76/02; H04M 2242/04

USPC ........ 455/404.1, 450, 451, 452.1–452.2, 464, 455/509; 379/45

See application file for complete search history.

(56) References Cited

U.S. PATENT DOCUMENTS 3,742,197 A    6/1973    Pommerening
5,043,736 A    8/1991    Darnell
(Continued)

FOREIGN PATENT DOCUMENTS

EP    0 545 783 B1    6/1993
WO    89/12835 A1    12/1989
WO    99/49677 A1    9/1999

OTHER PUBLICATIONS

Coleman A. et al: "Subjective Performance Evaluation of the RPE-LTP Codec for the Pan-European Cellular Digital Mobile Radio System," GLOBECOM 1989 IEEE Global Telecommunications Conference and Exhibition, vol. 2, Nov. 27-30, 1989, p. 1075, XP-002143130 IEEE, New York, NY, USA.

(Continued)

*Primary Examiner* — Wayne Cai
(74) *Attorney, Agent, or Firm* — Stolowitz Ford Cowger LLP

(57) ABSTRACT

An in-vehicle system (IVS) captures data such as location data and in an emergency automatically places a call to an emergency call taker or PSAP via a wireless telecommunications network. After a voice call session is established, the IVS system transmits a predetermined control signal through the voice channel. The control signal directs the call taker system to prepare to receive data. Preferably, the control signal comprises at least one audio frequency tone. This may be done without human intervention. In this way, emergency information is transmitted accurately and with minimum delay. After transmission of essential information, the IVS system may switch on audio connections for live human voice conversation.

19 Claims, 4 Drawing Sheets

(51) Int. Cl.
*H04M 11/06* (2006.01)
*H04W 4/22* (2009.01)
*H04W 76/00* (2009.01)
*H04W 76/02* (2009.01)

(56) References Cited

U.S. PATENT DOCUMENTS

| | | | |
|---|---|---|---|
| 5,218,618 A | 6/1993 | Sagey | |
| 5,422,816 A | 6/1995 | Sprague | |
| 5,515,043 A | 5/1996 | Berard | |
| 5,519,403 A | 5/1996 | Bickley | |
| 5,539,810 A | 7/1996 | Kennedy, III | |
| 5,555,286 A | 9/1996 | Tendler | |
| 5,640,444 A | 6/1997 | O'Sullivan | |
| 5,712,899 A | 1/1998 | Pace, II | |
| 5,761,204 A | 6/1998 | Grob | |
| 5,786,789 A | 7/1998 | Janky | |
| 5,864,763 A | 1/1999 | Leung | |
| 5,918,180 A | 6/1999 | Dimino | |
| 5,978,676 A | 11/1999 | Guridi | |
| 6,044,257 A | 3/2000 | Boling | |
| 6,208,959 B1 | 3/2001 | Jonsson | |
| 6,226,529 B1 | 5/2001 | Bruno | |
| 6,275,990 B1 | 8/2001 | Dapper | |
| 6,345,251 B1 | 2/2002 | Jansson | |
| 6,351,495 B1 | 2/2002 | Tarraf | |
| 6,526,026 B1 | 2/2003 | Menon | |
| 6,681,121 B1 | 1/2004 | Preston | |
| 6,690,681 B1 | 2/2004 | Preston | |
| 6,690,922 B1 | 2/2004 | Lindemann | |
| 6,754,265 B1 | 6/2004 | Lindemann | |
| 8,155,141 B2* | 4/2012 | Cordeiro et al. | 370/458 |
| 2002/0093924 A1* | 7/2002 | Preston et al. | 370/328 |
| 2006/0184679 A1 | 8/2006 | Izdepski et al. | |
| 2006/0193447 A1* | 8/2006 | Schwartz | 379/45 |
| 2007/0149166 A1 | 6/2007 | Turcotte et al. | |
| 2009/0015652 A1* | 1/2009 | Katz | 348/14.01 |
| 2009/0046538 A1 | 2/2009 | Breed et al. | |
| 2009/0265173 A1 | 10/2009 | Madhavan | |
| 2009/0306976 A1 | 12/2009 | Joetten | |
| 2010/0202368 A1* | 8/2010 | Hans | 370/329 |
| 2011/0063987 A9 | 3/2011 | Simmons | |
| 2011/0096769 A1 | 4/2011 | Sim | |

OTHER PUBLICATIONS

Lin D. et al: "Data Compression of Voiceband Modem Signals," 40th IEEE Vehicular Technology Conference on the Move in the 90's, May 6-9, 1990, pp. 323-325, XP000204133 IEEE, New York, NY, USA.

Mueller A. J. et al: "A DSP Implemented Dual 9600/7200 BPS TCM Modem for Mobile Communications over FM Voice Radios," Proceedings of the 1997 6th IEEE Pacific Rim Conference on Communications, Computer and Signal Processing, vol. 2, Aug. 20-22, 1997, pp. 758-761, XP000852273 IEEE, New York, NY, USA.

"Intelligent transport systems—ESafety—Ecall High level application protocols" 3GPP Generation Partnership Project (#GPP), Mobile Competence Centre; 650, Route Des Lucioles; F-06921 Sophia-Antipolis Cedex; France, No. Kista; 20090814, Aug. 14, 2009 (Aug. 14, 2009), XP050356954 [retrieved on Aug. 14, 2009].

3GPP TS 22.101 Technical Specification: 3rd Generation Partnership Project; Technical Specification Group Services and System Aspects Service aspects; Service principles (Release 9); Dec. 2008; 55 pages.

3GPP TS 26.267 v. 1.0.0 Technical Specification: 3rd Generation Partnership Project; Technical Specification Group Services and System Aspects; eCall Data Transfer; In-bank model solution; General description; Release 8; Sep. 2008; 28 pages.

MSG-3GPP eCall Meeting #2; Amsterdam, The Netherlands, Airbiquity, "In-Band Modem Data Transfer for eCall" dated Jan. 23, 2006.

* cited by examiner

IN-VEHICLE SYSTEM (IVS) CONTROL OF EMERGENCY DATA COMMUNICATIONS

RELATED APPLICATIONS

This application is a continuation of U.S. patent application Ser. No. 12/716,103 filed on Mar. 2, 2010 which claims the benefit of U.S. Provisional Patent Application No. 61/156,968 filed Mar. 3, 2009 each of which are herein incorporated by reference in its entirety.

COPYRIGHT NOTICE

© 2009-2010 AIRBIQUITY INC. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR §1.71 (d).

TECHNICAL FIELD

This invention pertains to in-vehicle systems, such as motor vehicle systems, for transmitting emergency information, including vehicle location information, to police, fire, E911 or other public safety officials via the wireless telecommunications network.

BACKGROUND OF THE INVENTION

Emergency calls to police, fire, medical and other public safety officials are important to nearly everyone. Public safety answering facilities, or PSAPs, such as the E911 service are nearly ubiquitous in the United States. Similar services are provided in most of Europe using the E112 service. In all cases, wireless telecommunications, for example cell phones, present distinct technical challenges over existing land-line technologies. For example, systems now exist to enable an emergency operator to look up a caller's location in a database (ANI) when a call is received from a land line. When a wireless call comes in, the location of the caller is difficult if not impossible to determine. Consequently, dispatching appropriate emergency responders and or equipment to the correct location in a timely manner is a challenge.

SUMMARY OF THE INVENTION

The following is a summary of the invention in order to provide a basic understanding of some aspects of the invention. This summary is not intended to identify key/critical elements of the invention or to delineate the scope of the invention. Its sole purpose is to present some concepts of the invention in a simplified form as a prelude to the more detailed description that is presented later.

In one embodiment, a communications method includes the steps of, in a mobile system, detecting an available wireless telecommunication network. The mobile system may be implemented in a vehicle, for example a motor vehicle. Detecting available wireless networks may be repeated periodically as the vehicle is moving. At a minimum, only voice services are necessary as further explained below.

The method further calls for registering with the detected carrier; detecting an emergency event; and capturing and storing data descriptive of the emergency event. This data may include the type of emergency, for example an air bag deployment or fire, and it preferably include the current location of the vehicle. Next, the method calls for initiating a wireless voice call session on the wireless telecommunication network to a selected call taker service. An emergency number to call may be pre-programmed. One of several PSAP numbers may be selected responsive to the detected type of emergency.

In one embodiment, after the voice call session is established, the method further proceeds with automatically transmitting a predetermined control signal in the voice channel, wherein the control signal comprises at least one audio frequency tone selected within the range of human voice to avoid corruption by voice coding elements of the wireless telecommunication network. The system preferably receives an acknowledge signal from the selected call taker service indicating that the service is ready to receive data.

Finally, responsive to the acknowledge signal, the method calls for transmitting the stored data in the voice channel session by using an in-band signaling modem technique to avoid corruption by voice coding elements of the digital wireless telecommunication network.

In some embodiments, after transmitting the stored data, the system may transmit a second control signal to indicate completion of sending the stored data.

Another aspect of the present disclosure is directed to an in-vehicle system (IVS) arranged for contacting a call taker in the event of an emergency, and controlling data transmission by sending a control signal in-band to direct the call taker system to prepare to receive data, for example by switching an in-band modem. Another aspect of the present disclosure is directed to software for implementing an IVS.

Additional aspects and advantages of this invention will be apparent from the following detailed description of preferred embodiments, which proceeds with reference to the accompanying drawings.

DETAILED DESCRIPTION OF PREFERRED EMBODIMENTS

Figure 1:
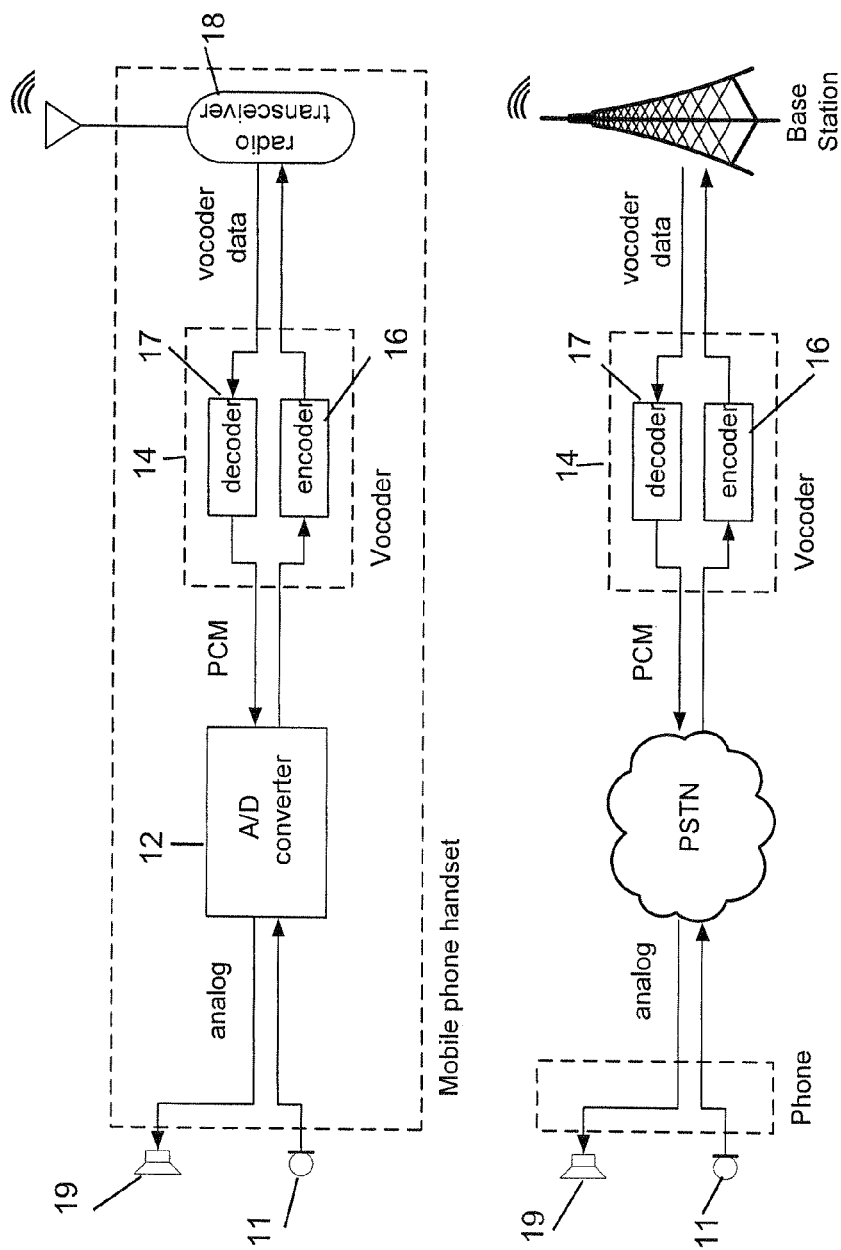
FIG. 1 is a simplified block diagram illustrating an example of a mobile phone handset and telecommunication pathways between an analog phone and a digital wireless base station.

FIG. 1 is a simplified block diagram illustrating the typical speech path for a wireless voice call; i.e., a telephone call over the wireless telecommunications network. The upper diagram shows a simplified mobile phone handset. Analog voice signals from a microphone are digitized by an A/D converter, and then fed to a vocoder encoding algorithm (at 8000 samples/sec). The encoder produces packets of compressed data (typically one packet per 20-ms frame of audio) and feeds this data stream to a radio transceiver. On the other side (lower diagram), a radio receiver passes the packets to the decoding algorithm, which then reconstructs (imperfectly) the original voice signal as a PCM stream. This PCM stream is eventually converted back into an analog voltage which is then applied to a speaker.

Using this type of system, modest amounts of data (here we mean user data, not vocoder speech data) can be transmitted "in-band" through careful selection of frequencies, timing, and the use of special techniques that "trick" a vocoder into transmitting information by making that information "look like" human voice data. This type of data communication, using the voice channel of a wireless system, is sometimes called "in-band signaling." It can be implemented in hardware and or software referred to as an "in-band signaling modem," borrowing the old modem term (modulator-demodulator) familiar in traditional "land line" telecommunications.

Below, we describe an in-vehicle "wireless telecommunications module." Such a module is typically built into a vehicle, and may not be physically mounted in view of the driver or passengers. In one embodiment, the wireless telecommunications module corresponds to the "Embedded phone module" shown in FIG. 2. The wireless module may operate without human intervention, for example to initiate an emergency call, as discussed later. In some embodiments, the in-vehicle module may not have a microphone or speaker, but it nevertheless can provide for audio voice communications, through the vehicle audio system.

Several issued patents disclose in-band signaling technology that communicates digital data over a voice channel of a wireless telecommunications network. In one example, an input receives digital data. An encoder converts the digital data into audio tones that synthesize frequency characteristics of human speech. The digital data is also encoded to prevent voice encoding circuitry in the telecommunications network from corrupting the synthesized audio tones representing the digital data. An output then outputs the synthesized audio tones to a voice channel of a digital wireless telecommunications network. In some cases, the data carrying "tones" are sent along with simultaneous voice. The tones can be made short and relatively unobtrusive. In other implementations, sometimes called "blank and burst," the voice is cut off while data is transmitted through the voice channel. In still other implementations, portions of the audio frequency spectrum are used for voice, while other portions are reserved for data. This aides in decoding at the receiving side.

In-band signaling requires appropriate facilities (e.g. an in-band modem) at both ends of the call. A challenge arises in detecting when to turn the modem on and off. That is, once a call is connected (link established), when should the receiving system switch from voice mode of operation (using microphone and speaker typically), to a data mode in which it works to recover data from the audio (voice) channel. Preferably, this should be done automatically, i.e., without human intervention. Prior art control signaling in a wireless network employs a control channel, which is not in-band. Unlike the voice channel, control channel signaling may be proprietary to the carrier and therefore not available to all client systems.

Figure 2:
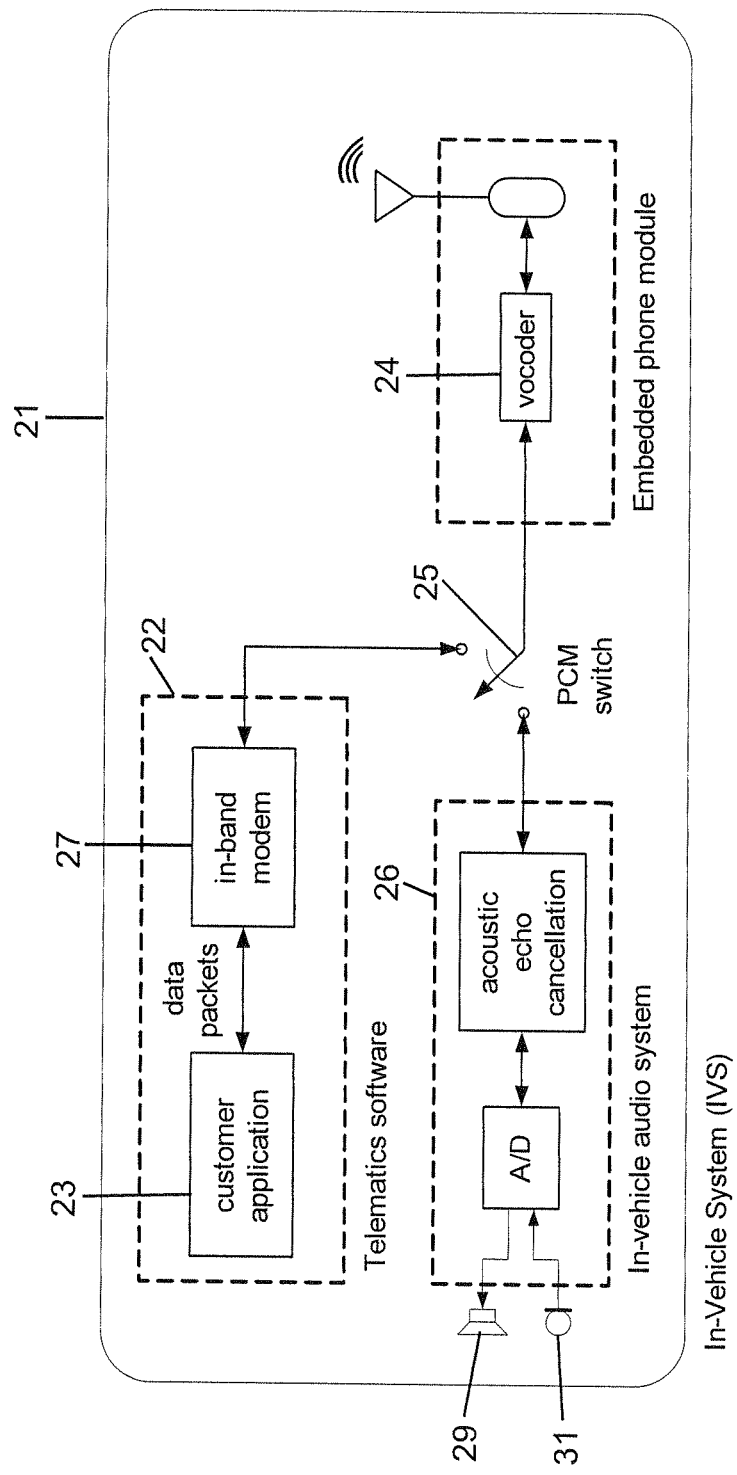
FIG. 2 is a simplified block diagram illustrating one example of an in-vehicle system (IVS).

One application of this technology, used for illustration in this document, is communications with a motor vehicle. Today, many vehicles have some capability for communications over a wireless networks. We refer to these vehicle systems as a telematics client system. FIG. 2 is a simplified block diagram of an illustrative In-Vehicle System (IVS). It shows an example of the relevant portion of a typical telematics client system. This client system consists of embedded hardware and software designed to operate in an automobile environment.

In FIG. 2, the telematics software includes a "customer application," which may be almost any application, in particular one that employs data transfer via the wireless network. For example, the customer application may relate to navigation or entertainment. In operation, the customer application conveys data (preferably data packets) to an in-band signaling modem. The in-band modem converts the data (along with packet headers and other overhead as appropriate) into audio frequency tones, which are presented at the "PCM Switch."

Recently, in-vehicle systems (IVS) are being developed to achieve several goals. First, a modern IVS may incorporate wireless telecommunication equipment built into the vehicle, thereby enabling communications, for example to a PSAP in the event of an emergency, even if no passenger on board has a cell phone available. Preferably, the IVS telecom systems take advantage of one or more of the available wireless networks (PLWN) for emergency communications. The networks can be configured to handle emergency calls such as E112 or E911 even where the "caller" (person or machine) is not a subscriber to other network services. Indeed, this is a legal requirement is some jurisdictions.

Second, an IVS can be arranged to place a call automatically under certain circumstances, such as a crash, when the vehicle operator may be unable to place a call, for example due to injury or loss of consciousness. In such cases, where no voice conversation is possible, help can be dispatched nonetheless if appropriate information, including some indication of the vehicle location, is transmitted successfully to the PSAP.

Toward that end, certain evolving standards, for example the "eCall" initiative in the European Community, suggest an automatically or manually initiated E112 voice call supplemented by a Minimum Set of Data (MSD) containing vehicle specific and high accuracy location information. Using this information, the emergency services can accurately locate and provide more rapid assistance to accident victims, thus saving more lives. As with the E112 call, the integrity of the MSD sent from the vehicle to the PSAP has to be ensured.

Figure 3:
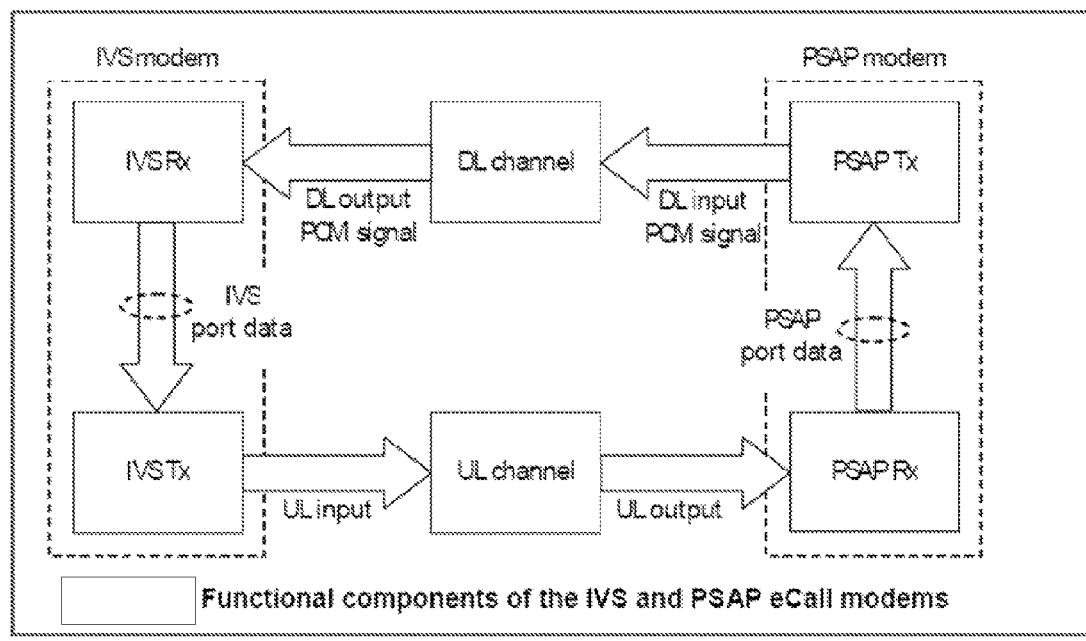
FIG. 3 is a simplified block diagram illustrating functional components of IVS and PSAP (public safety answering point) modems in one embodiment.

FIG. 3 is a simplified block diagram illustrating functional components of IVS and PSAP (public safety answering point) modems in one embodiment. Here, the IVS modem includes receive (Rx) and transmit (Tx) components. Again, this diagram is functional, not physical. The Rx and Tx elements typically are implemented in software executable in the same processor such as a DSP. A PSAP or other call taker facility has a similar in-band modem arrangement, with Tx and Rx elements. Transmission from the IVS modem to the PSAP may be designated the uplink (UL) channel, while the opposite direction is called the downlink (DL) channel. In a preferred embodiment, these channels are realized by wireless voice sessions, i.e., in the voice channel, and may be operable in full duplex.

In one embodiment, a Minimum Set of Data (MSD) is sent from an In Vehicle System (IVS), for example across available 2G or 3G mobile networks (MNO), to a Public Safety Answering Point (PSAP). Various signaling options may be used, and effective voice communication (in the sense of people speaking) may not be presumed, although a "voice channel" or "in-band" communication process may be used for data nonetheless, as further discussed below. For example, a voice channel call may be initiated automatically by an IVS, and that call can be "answered" automatically by a suitably equipped call-taker system/computer at another location.

Thus there may be least two categories of emergency calls over the wireless network to a PSAP. In one case, a voice call is placed, and the caller, a live person, communicates with the call taker (another live person) using speech. In this case, transfer of data can follow when the parties agree to do so, or it can be sent concurrently during the voice call. In some systems, data transfer is initiated by the PSAP server sending a signal to the calling unit (IVS) to instruct it to "start sending data." This is done after the server enables a modem to start receiving the data, for example using an in-band modem.

The present disclosure is concerned primarily with the other category of calls, i.e., those placed automatically by an IVS in an emergency situation. Here, in accordance with the present disclosure, the IVS controls start of the data session. In an embodiment, it does so prior to the parties engaging in a human voice conversation. Or, there may be no live conversation at all. In one embodiment, the essential data, for example MSD, is received at the PSAP before voice conversation begins. In one embodiment, the MSD may be decoded, and displayed on-screen at the call-taker center. The information may also be loaded into a message under software control for forwarding to "first responders" such as police, fire or medical personnel. By forwarding the data such as location automatically, the chance for human error, for example in typing in an address or highway number, is removed.

By having the IVS initiate the data transfer, rather than the call-taker system, no human intervention is required and delay is minimized. Another benefit of having the IVS initiates the data transfer is that the PSAP can differentiate between the regular E112/E911 emergency calls and the vehicle emergency call which is followed by the MSD data transmission. The existing mobile communications network is not impacted by this implementation while the PSAP can continue to support existing E112/E911 emergency calls as usual without any procedural changes.

Figure 4:
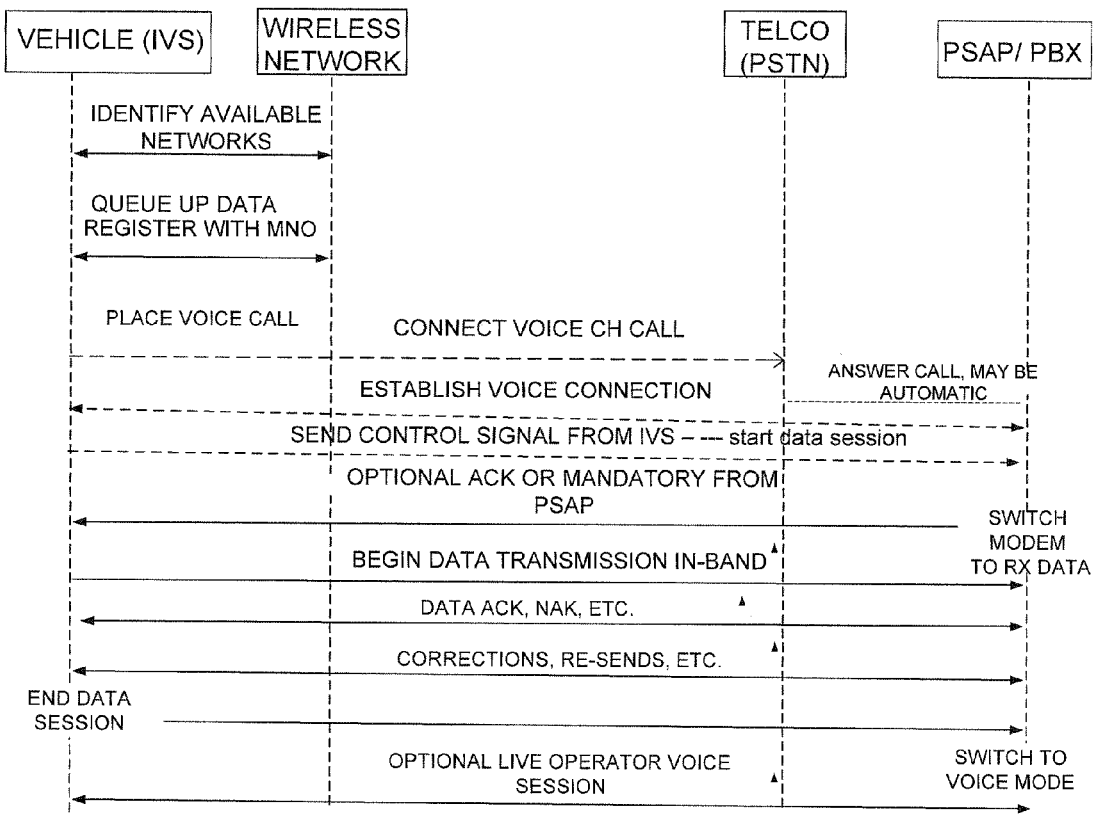
FIG. 4 is a simplified message flow diagram illustrating one embodiment of a methodology in accordance with the present disclosure.

The signaling from the IVS to the PSAP server to begin an emergency data session can be done using various techniques. Preferably, this control signaling is done "in-band" meaning within the voice channel connection. One embodiment is illustrated in FIG. 4. The in-band "start data session" signaling may comprise a predetermined audio signal or tone. The audio signal may comprise one or multiple audio frequencies, and it may comprise various waveforms. The call taker apparatus (or server) is configured to recognize whatever control signal is selected. Preferably, the duration of the signaling is on the order of tens or a few hundreds of milliseconds. The signaling may be done within a larger data packet. An in-band modem at the server side is programmed to recognize the "start data session" signaling, and begin capturing data in response to it.

In some embodiments, the server may send an acknowledgement signal back to the IVS to confirm receipt of the command to start a data session. In other embodiments, the server may just receive the data, and then send an acknowledgement signal back to the IVS to confirm successful receipt of the data. A simplified communication diagram illustrating one embodiment is shown in FIG. 4.

After the emergency data is transmitted, the IVS may terminate the call session. In another embodiment, the IVS sends a control signal to the server to indicate that the session is concluded. In that case, the server may be confident that the data session was successful, and that it is safe to take down the call session. Thus, the data session may be terminated by the IVS, as illustrated, or by the PSAP/server. Preferably, these additional control signals also are transmitted in-band, using audio tones. Again, the signals may comprise a single predetermined frequency tone, or a combination of tones. Control signals may be a part of a message or packet.

The processes described above preferably are implemented in software, on the vehicle side, for example, for execution in an on-board processor. It may be the same processor that implements an in-band signaling modem. It may be part of, or coupled to, a wireless NAD in a vehicle that is also used for other services, such as concierge services. In an alternative embodiment, the processes described herein may be executed in software in a vehicle that communicates with a user's personal communication device, such as a cell phone, via a short-range wireless protocol, such as Bluetooth, so that the user's phone provides the necessary wireless telecom channel. At the receiving or "call taker" side, for example a government agency or "first responder" facility, the foregoing methodologies are also preferably implemented in software, in a PBX, computer, server or some other processor.

We use the term software herein in its commonly understood sense to refer to programs or routines (subroutines, objects, plug-ins, etc.), as well as data, usable by a machine or processor. As is well known, computer programs generally comprise instructions that are stored in machine-readable or computer-readable storage media. Some embodiments of the present invention may include executable programs or instructions that are stored in machine-readable or computer-readable storage media, such as a digital memory. We do not imply that a "computer" in the conventional sense is required in any particular embodiment. For example, various processors, embedded or otherwise, may be used in equipment such as a motor vehicle.

Memory for storing software again is well known. In some embodiments, memory associated with a given processor may be stored in the same physical device as the processor ("on-board" memory); for example, RAM or FLASH memory disposed within an integrated circuit microprocessor or the like. In other examples, the memory comprises an independent device, such as an external disk drive, storage array, or portable FLASH key fob. In such cases, the memory becomes "associated" with the digital processor when the two are operatively coupled together, or in communication with each other, for example by an I/O port, network connection, etc. such that the processor can read a file stored on the memory. Associated memory may be "read only" by design (ROM) or by virtue of permission settings, or not. Other examples include but are not limited to WORM, EPROM, EEPROM, FLASH, etc. Those technologies often are implemented in solid state semiconductor devices. Other memories may comprise moving parts, such a conventional rotating disk drive. All such memories are "machine readable" or "computer-readable" and may be used store executable instructions for implementing various embodiments of the present invention for mail piece sorting and related operations.

A "software product" or "computer program product" refers to a memory device in which a series of executable instructions are stored in a machine-readable form so that a suitable machine or processor, with appropriate access to the software product, can execute the instructions to carry out a process implemented by the instructions. Software products are sometimes used to distribute software. Any type of machine-readable memory, including without limitation those summarized above, may be used to make a software product. That said, it is also known that software can be distributed via electronic transmission ("download"), in which case there typically will be a corresponding software product at the transmitting end of the transmission, or the receiving end, or both.

It will be obvious to those having skill in the art that many changes may be made to the details of the above-described embodiments without departing from the underlying principles of the invention. The scope of the present invention should, therefore, be determined only by the following claims.

The invention claimed is:

1. An in-vehicle system for emergency communications, the in-vehicle system comprising:
   a digital processor;
   an emergency event detector arranged to communicate with the digital processor;
   a GPS receiver arranged to provide location information to the digital processor;
   a memory coupled to the digital processor for storing program code and/or data;
   a wireless telecommunications module arranged for interacting with a wireless telecommunications network as a mobile terminal unit and operatively coupled to the digital processor;
   an in-band modem coupled to the digital processor or executable as software on the digital processor and operatively coupled to the wireless telecommunications module for transmitting data in the voice channel during a wireless voice session; and
   application software for controlling the in-vehicle system, the application software configured to:
      transmit a predetermined control signal in the voice channel responsive to establishment of the wireless voice session using the in-band modem, the predetermined control signal comprising a start data session indication that is configured to signal a call taker server to prepare to receive data transmitted in-band during the voice call session;
      after transmitting the predetermined control signal, determine whether the call taker service is ready to receive data on the voice channel; and
      responsive to determining that the call taker service is ready to receive data on the voice channel, transmit the stored program code and/or data in the wireless voice call session using the in-band modem.

2. The in-vehicle system according of claim 1, wherein the application software is configured to make a selection among available wireless carriers based on predetermined criteria for making a wireless call in response to detection of an emergency event.

3. The in-vehicle system according of claim 1, wherein the wireless telecommunications module is configured to register with a wireless carrier only after the digital processor signals an emergency event.

4. The in-vehicle system according of claim 1, wherein the application software is further configured to, after transmitting the stored program code and/or data, transmit another control signal to indicate completion of sending the stored program code and/or data.

5. The in-vehicle system according of claim 1, wherein the application software is further configured to, after transmitting the stored program code and/or data, enable live human voice communications over the established voice call session.

6. The in-vehicle system according of claim 1, wherein the application software is further configured to, select an audio frequency tone for the predetermined control signal responsive to which wireless telecommunication network is being used.

7. The in-vehicle system according of claim 6, wherein the application software is further configured to, change the selection of the audio frequency tone for the predetermined control signal to a different frequency and resend the predetermined control signal using the different frequency if the acknowledge signal is not received within a predetermined time.

8. The in-vehicle system according of claim 6, wherein the stored program code and/or data includes a current location of the GPS receiver.

9. The in-vehicle system according of claim 1, wherein the transmitted program code and/or data includes at least a predetermined minimum set of data (MSD).

10. The in-vehicle system according of claim 1, wherein the transmitted program code and/or data includes an identifier of a type of emergency that was detected.

11. An in-vehicle system for emergency communications, the in-vehicle system comprising:
    a digital processor;
    an emergency event detector arranged to communicate with the digital processor;
    a GPS receiver arranged to provide location information to the digital processor;
    a memory coupled to the digital processor for storing program code and/or data;
    a wireless telecommunications module arranged for interacting with a wireless telecommunications network as a mobile terminal unit and operatively coupled to the digital processor;
    an in-band modem coupled to the digital processor or executable as software on the digital processor and operatively coupled to the wireless telecommunications module for transmitting data during a wireless voice session comprising a plurality of channels including a first signaling channel and a second channel that is different than the first signaling channel;
    wherein the in-band modem is further operatively coupled to the wireless telecommunications module for transmitting data in the second channel during the wireless voice session; and
    application software for controlling the in-vehicle system, the application software configured to:
       transmit a predetermined control signal in the second channel responsive to establishment of the wireless voice session using the in-band modem, the predetermined control signal comprising a start data session indication that is configured to signal a call taker server to prepare to receive data transmitted in-band during the voice call session; and
       after transmitting the predetermined control signal, transmit the stored program code and/or data in the wireless voice call session using the in-band modem.

12. The in-vehicle system according of claim 11, wherein the application software is further configured to, after transmitting the stored program code and/or data, transmit another control signal to indicate completion of sending the stored program code and/or data.

13. The in-vehicle system according of claim 11, wherein the application software is further configured to, after transmitting the stored program code and/or data, enable live human voice communications over the established voice call session.

14. The in-vehicle system according of claim 11, wherein the application software is further configured to, select an audio frequency tone for the predetermined control signal responsive to which wireless telecommunication network is being used.

15. The in-vehicle system according of claim 14, wherein the application software is further configured to, change the selection of the audio frequency tone for the predetermined control signal to a different frequency and resend the predetermined control signal using the different frequency if the acknowledge signal is not received within a predetermined time.

16. The in-vehicle system according of claim 14, wherein the stored program code and/or data includes a current location of the GPS receiver.

17. The in-vehicle system according of claim 11, wherein the transmitted program code and/or data includes at least a predetermined minimum set of data (MSD).

18. The in-vehicle system according of claim 11, wherein the application software is further configured to:
   after transmitting the predetermined control signal, determine whether the call taker service is ready to receive data on the second channel; and
   transmit the stored program code and/or data in the wireless voice call session using the in-band modem in response to determining that the call taker service is ready to receive data on the second channel.

19. The in-vehicle system according to claim 11, wherein the second channel comprises a voice channel.

\* \* \* \* \*

UNITED STATES PATENT AND TRADEMARK OFFICE
CERTIFICATE OF CORRECTION

PATENT NO. : 8,971,839 B2  
APPLICATION NO. : 13/786733  
DATED : March 3, 2015  
INVENTOR(S) : Leong Hong It is certified that error appears in the above-identified patent and that said Letters Patent is hereby corrected as shown below:

In The Claims

Column 7  
Line 27, "…transmitted in- band…" should read --"…transmitted in-band…"--  
Line 36, "…according of claim 1,…" should read --"…according to claim 1,…"--  
Line 41, "…according of claim 1,…" should read --"…according to claim 1,…"--  
Line 45, "…according of claim 1,…" should read --"…according to claim 1,…"--  
Line 50, "…according of claim 1,…" should read --"…according to claim 1,…"--  
Line 54, "…according of claim 1,…" should read --"…according to claim 1,…"--  
Line 59, "…according of claim 6,…" should read --"…according to claim 6,…"--

Column 8  
Line 1, "…according of claim 6,…" should read --"…according to claim 6,…"--  
Line 4, "…according of claim 1,…" should read --"…according to claim 1,…"--  
Line 7, "…according of claim 1,…" should read --"…according to claim 1,…"--  
Line 46, "…according of claim 11,…" should read --"…according to claim 11,…"--  
Line 51, "…according of claim 11,…" should read --"…according to claim 11,…"--  
Line 56, "…according of claim 1,…" should read --"…according to claim 1,…"--  
Line 61, "…according of claim 14,…" should read --"…according to claim 14,…"--

Column 9  
Line 1, "…according of claim 14,…" should read --"…according to claim 14,…"--  
Line 4, "…according of claim 11,…" should read --"…according to claim 11,…"--  
Line 7, "…according of claim 11,…" should read --"…according to claim 11,…"--

Signed and Sealed this  
Sixteenth Day of August, 2016

Michelle K. Lee  
*Director of the United States Patent and Trademark Office*